C. W. KINSMAN.
PERFORATED UTENSIL COVER.
APPLICATION FILED APR. 8, 1919.
1,328,001. Patented Jan. 13, 1920.
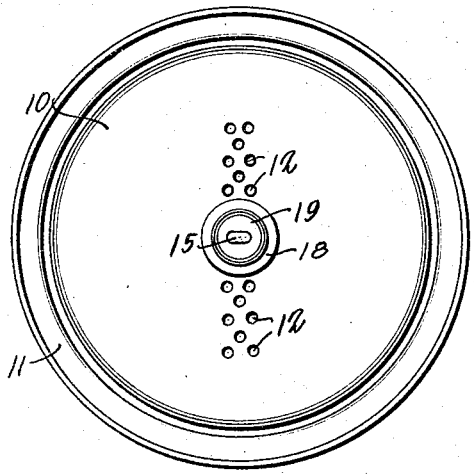
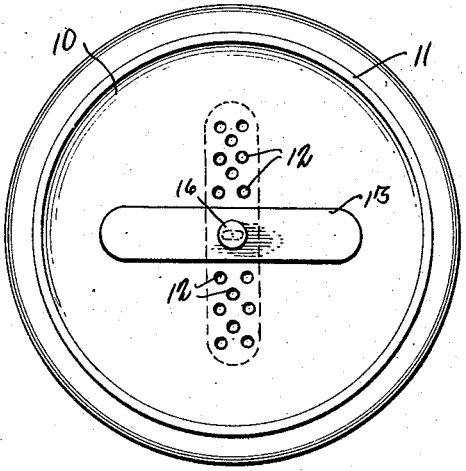
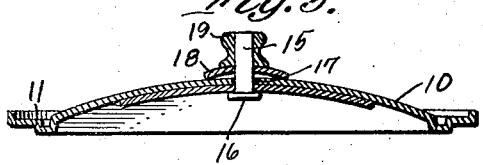
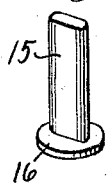
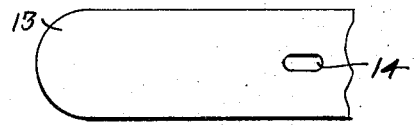
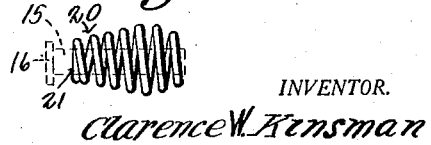
WITNESS:
Guy M. Spring
INVENTOR.
Clarence W. Kinsman
BY
Richard B. Owen
ATTORNEY.

UNITED STATES PATENT OFFICE.

CLARENCE WM. KINSMAN, OF NEW YORK, N. Y., ASSIGNOR OF TWO-THIRDS TO HERMON H. KINSMAN, OF NEW YORK, N. Y.

PERFORATED UTENSIL-COVER.

1,328,001.      Specification of Letters Patent.      Patented Jan. 13, 1920.

Application filed April 8, 1919. Serial No. 288,445.

*To all whom it may concern:*

Be it known that I, CLARENCE W. KINSMAN, a citizen of the United States, residing at New York city, in the county of New York and State of New York, have invented certain new and useful Improvements in Perforated Utensil-Covers, of which the following is a specification.

This invention relates to domestic cooking vessels and more particularly to a utensil cover.

One object of this invention is the production of a utensil cover having a plurality of perforations therein, thus allowing food within a receptacle upon which the cover is placed to be ventilated while the cover being used upon a vessel in which food is cooking will permit the vapor to easily escape from the vessel.

Another object of this invention is the production of a perforated utensil cover wherein efficient means is provided for regulating the freeness of passage through the perforations thereof.

Another object of this invention is the production of a perforated utensil cover having a rotatable shutter thereon with means associated therewith for rotating the shutter and holding the same in adjusted condition, whereby the shutter may be moved to allow free passage through all the perforations of the cover although it may be further moved to close a few of the apertures or to entirely close all of the apertures or perforations according to the desires of the user.

One practical form of construction and assembly of the present invention will be hereinafter described, and is illustrated in the drawing, in which:—

Figure 1 is a top plan view of the utensil cover, constructed in accordance with the present invention.

Fig. 2 is a bottom plan view of the device.

Fig. 3 is a transverse section through the utensil cover.

Fig. 4 is a detail perspective view of the standard used for connecting the handle portion of the device to the shutter.

Fig. 5 is a fragmentary plan view of the shutter.

Fig. 6 is an end elevation of one form of handle.

Fig. 7 is a side elevation of the device shown in Fig. 6.

In the preferred embodiment of the present invention about to be specifically described, the numeral 10 designates a conventional form of utensil cover having the usual retaining portion 11 adjacent the periphery thereof. Although the cover as herein illustrated is shown as concavo-convex in cross section, it is obvious the device disclosed may be used upon flat covers or any desired form of cover, the one herein illustrated being merely included for disclosing the manner of construction and operation of the invention. The cover 10 is provided with a plurality of perforations or apertures 12 formed in a row transversely across the cover, although of course, any desired arrangement of apertures or perforations may be employed without departing from the spirit of the invention.

A movable shutter 13 is provided and is of an elongated construction as clearly illustrated although it should be understood that the shutter may be of such shape as to efficiently close all the apertures or perforations in a cover, according to the arrangement of such apertures. As the apertures or perforations 12 herein shown are in a row, the shutter 13 is shown as elongated to close the apertures when desired as illustrated by dotted lines in Fig. 2. This shutter 13 is provided with an elongated slot 14 at the center thereof, and this shutter is adapted to be positioned upon the inner surface of the cover 10 as shown in Figs. 2 and 3.

The standard 15 is substantially rectangular in cross section to project through the slot 14 of the shutter 13 thus keying the shutter 13 upon the standard. A head 16 is formed on the inner end of the standard 15 as shown in Fig. 4, thus holding the shutter 13 from displacement over the lower end of the standard 15. This standard 15 projects through an opening 17 in the center of the cover 10, it being understood that the opening 17 should be large enough to permit the standard 15 to be rotated even though the same is of rectangular construction in cross section.

A bearing disk 18 is positioned upon the standard 15 and also bears upon the outer surface of the cover 10. By referring particularly to Fig. 3 it will be seen that the disk 18 is concavo-convex in cross section but it should be understood that the same is formed of resilient material. Accordingly only the periphery of the disk will engage the cover. The handle 19 is slipped onto the outer end of the standard 15 and is permanently secured thereto in any desired manner. This handle 19 bears upon the disk 18 as also shown in Fig. 3.

By referring to Figs. 6 and 7 it will be noted that instead of using a solid handle 19 which may become heated when the device is used upon a receptacle in which food is being cooked, a handle indicated at 20 may be employed. This handle 20 is formed of a single strand of metal and is coiled to form a plurality of spaced convolutions as shown clearly in Fig. 7. The ends of the strand, however, are coiled to form substantially rectangular receiving portions 21 which will allow the handle to be connected upon and keyed to the standard 15.

The device is constructed by forming a plurality of apertures or perforations through the cover 10 as above specified. The shutter 13 is placed in engagement with the under surface of the cover while the standard is passed therethrough and then receives a bearing disk 18 and the handle 19 thus causing the device to be completely assembled for use.

The cover may then be placed upon a vessel or utensil to form a closure therefor. If it is desired to allow the vessel to be efficiently ventilated, the handle 19 may be gripped and depressed, thus pushing downwardly upon the disk 18 and also push the standard 15 downwardly to relieve the binding action between the shutter 13 and the cover 10. The handle may then be rotated, thus causing the standard to rotate the shutter to move the same in a circle, whereby the shutter may be moved from under the perforations or apertures 12, thus allowing free passage therethrough as indicated in Fig. 2. When it is desired to use the cover upon a vessel in which food is being cooked, in order to hasten the rapid heating of such food, the shutter may be moved to close the apertures as shown in dotted lines in Fig. 2. As the food is cooking and vapor rises the shutter may be moved to allow free passage through only a few of the perforations or apertures 12 or through all of the perforations or apertures according to the desires of the user.

By providing the disk 18 which is of resilient material and is concavo-convex in cross section it will be seen that a resilient means is included for increasing the binding action between the shutter and the cover for firmly holding the shutter against accidental shifting when the device is in use. In the present instance, the shutter is used upon a concavo-convex cover and for this reason the shutter itself will produce a certain friction action which would not be apparent if the device were used upon a flat cover. However, by providing the disk as above specified irrespective of the construction of the cover, the shutter will be held in a frictional binding engagement therewith which will prevent its accidental shifting under any condition. However, when the user so desires, a handle may be gripped and pushed downwardly thus depressing the disk and reducing the frictional action between the shutter and the cover, thus allowing the shutter to be efficiently rotated. As above specified instead of using the handle 19 a handle such as shown in Fig. 6 may be used without departing from the spirit of the present invention.

It will therefore be seen that a very efficient means has been provided for a perforated utensil cover which will regulate the freeness of passage through the perforations in said cover to allow ventilation of the utensil or receptacle upon which the cover is being placed, this means being easily operated and then after being released will automatically adjust itself to prevent accidental shifting or displacement of the shutter which regulates the passage through the perforations or apertures.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent is:—

1. In a device of the class described, the combination of an apertured cover, a shutter, resilient means for yieldably holding said shutter in binding engagement with said cover and means for depressing the resilient means to relieve the shutter from its binding engagement to allow the shutter to be moved to open or close the apertures in said cover.

2. In a device of the class described, the combination of an apertured cover, a shutter, a rectangular standard having a head upon its inner end, said standard passing through said shutter and said cover, resilient means for supporting the standard for holding the shutter in a binding engagement with said cover, and means connected to the standards for depressing the resilient means and allowing the head of the standard to move downwardly to reduce the binding action between said shutter and cover, whereby the shutter may be easily moved to open or close the apertures in said cover.

3. In a device of the character described, the combination of an apertured cover, a shutter, a rectangular standard having a head upon its lower end, said standard passing through said shutter, a resilient concavo convex disk loosely mounted upon said cover, said standard passing through said disk and a handle fixed upon said standard and bearing upon said disk, whereby the resiliency of the disk will firmly hold the shutter in engagement with the cover, and said handle being adapted to be depressed against the resiliency of said disk to shift the standard through said cover to reduce the binding action between said shutter and cover, whereby the handle may turn the standard to easily move said shutter to open or close the apertures of said cover.

In testimony whereof I affix my signature in presence of two witnesses.

CLARENCE WM. KINSMAN.

Witnesses:
H. H. KINSMAN,
Mrs. STEPHEN A. DOUGLASS.